United States Patent

[11] 3,587,241

| [72] | Inventor | William F. Hagen<br>Denton, Tex. |
|---|---|---|
| [21] | Appl. No. | 773,723 |
| [22] | Filed | Nov. 6, 1968 |
| [45] | Patented | June 28, 1971 |
| [73] | Assignee | Turbo Refrigeration Company,<br>Denton, Tex. |

[54] COOLING CONSTRUCTION FOR FOODS PRODUCTS
11 Claims, 8 Drawing Figs.

[52] U.S. Cl. .................................................. 62/63,
62/374, 165/120
[51] Int. Cl. .....................................F25d 17/02,
F25d 25/04
[50] Field of Search........................................... 62/63, 381,
87, 374, 375; 165/120 (X)

[56] References Cited
UNITED STATES PATENTS
2,059,970 11/1936 Robillard...................... 62/63

| 2,879,005 | 3/1959 | Jarvis .......................... | 241/14 |
| 3,368,363 | 2/1968 | Alaburda et al. ............ | 62/64 |
| 3,410,101 | 11/1968 | Morris, Jr. .................... | 62/375X |

*Primary Examiner*—William E. Wayner
*Attorney*—McDougall, Hersh, Scott & Ladd

ABSTRACT: A construction for chilling and freezing of food products comprising an elongated trough and means for introducing the products along with a cooling fluid into one end of the trough. A rotatable screw is located within the trough, and openings are provided to permit movement of the fluid along the trough at a relatively high rate. The fluid tends to carry the food products through the trough; however, the openings are insufficient to permit passage of the products and, therefore, the screw serves as a retarding means which provides for controlled movement of the food products through the trough at a rate lower than the rate of movement of the fluid.

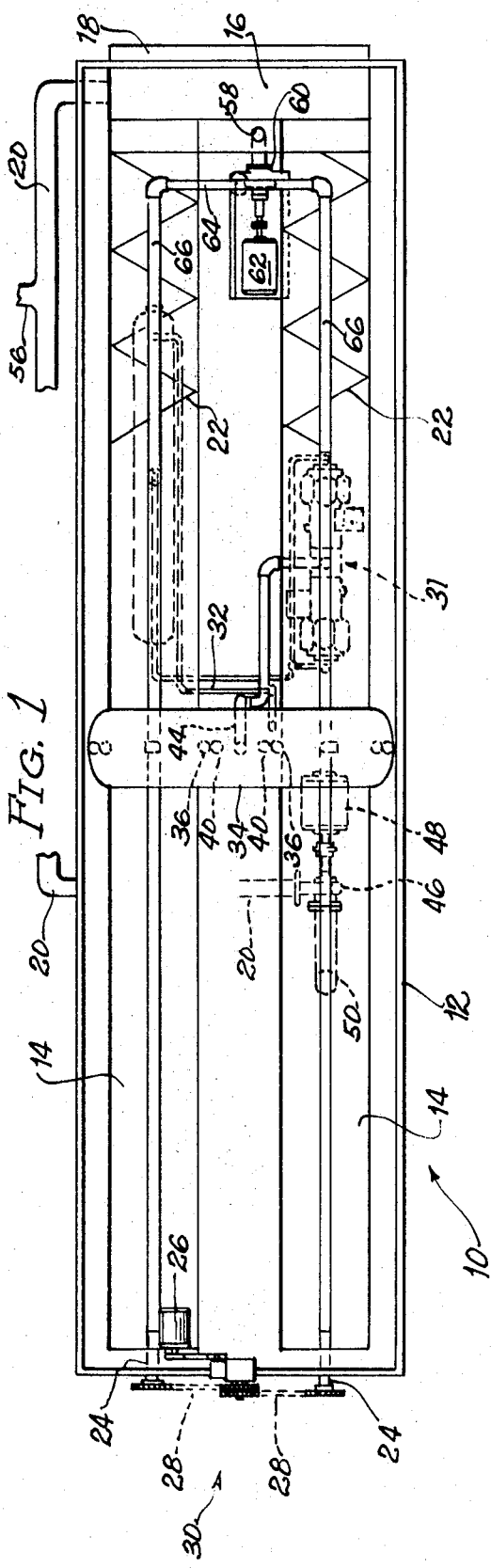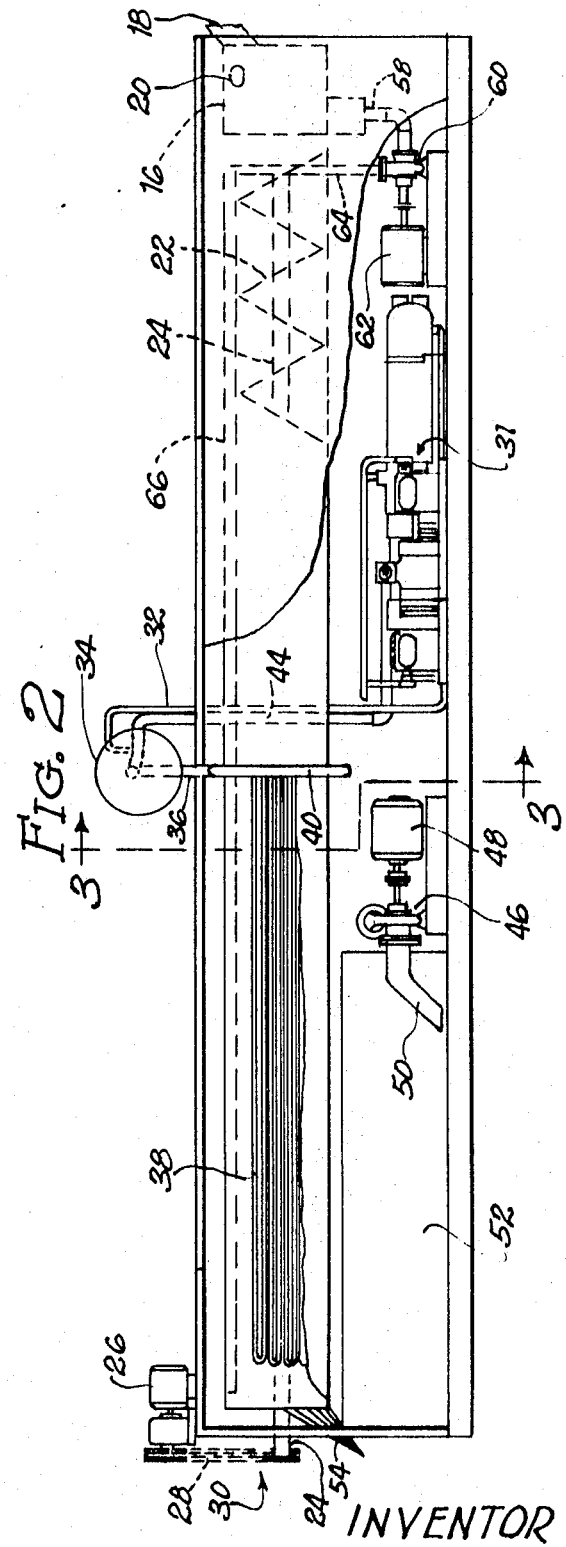

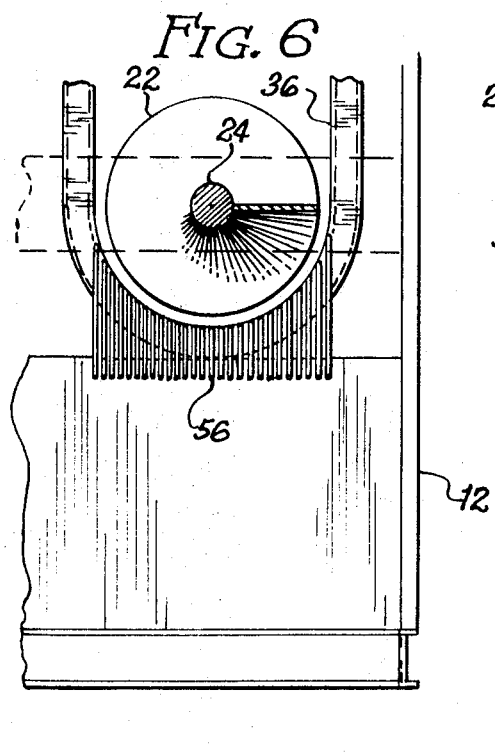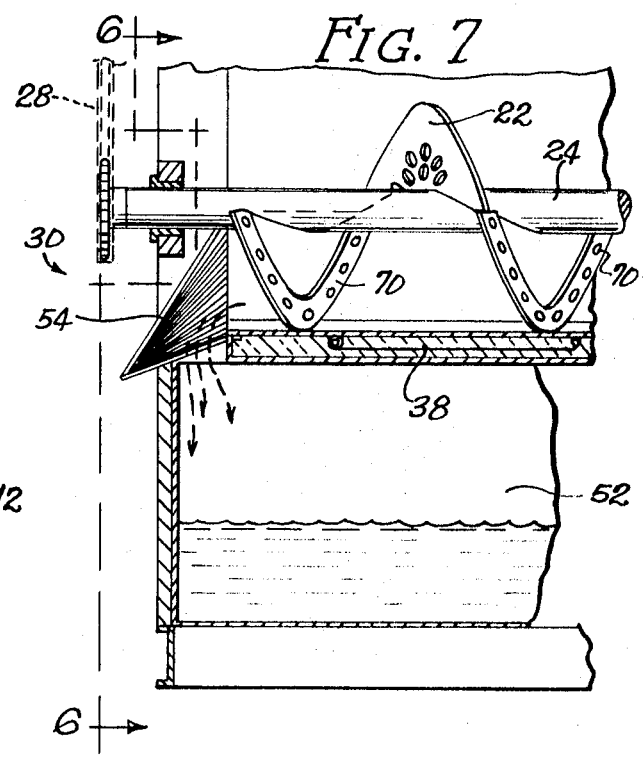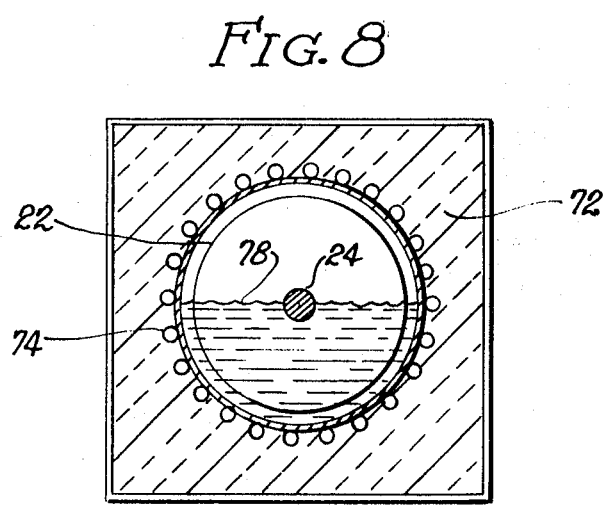

COOLING CONSTRUCTION FOR FOODS PRODUCTS

This invention relates to a cooling construction for use in conjunction with food products.

It is often necessary to chill or freeze food products in order to preserve the products until they are ready for consumption. For example, fruits and vegetables are often frozen after harvesting and then shipped to market so that the products will be relatively fresh when purchased. Other food products such as shrimp are handled in a similar fashion with a view toward preventing spoilage.

It is the primary object of the instant invention to provide a construction for the handling of food products so that chilling or freezing operations can be conducted in a highly efficient manner.

It is a more specific object of this invention to provide an improved system for the handling of food products wherein the products can be brought into rapid and intimate contact with a cooling medium to provide a high rate of heat transfer whereby the temperature of the food products will be quickly reduced to thereby provide maximum preservation of food values.

These and other objects of this invention will appear hereinafter and for purposes of illustration, but not of limitation, specific embodiments of the invention are shown in the accompanying drawings in which:

FIG. 1 is a plan view of a construction characterized by the features of this invention.

FIG. 2 is a side elevational view, partly cut away, of the construction shown in FIG. 1;

FIG. 6 is a fragmentary end elevation taken about the line 6-6 of FIG. 7;

FIG. 7 is a fragmentary, vertical, sectional view illustrating the discharge end of a construction characterized by the features of the invention; and, FIG. 8 is a schematic illustration of an alternative form of the invention.

The construction of this invention comprises an elongated trough having means for introducing food products and cooling fluid at one end. The cooling fluid moves relatively rapidly through the construction while contacting the food products to provide for rapid heat transfer and to thereby cool the food products to a desired reduced temperature. The construction includes a rotatable screw with openings being provided for passage of the fluid. The blades of the screw serve to retard the food products so that these products will not move through the construction as rapidly as the fluid. The use of the screw, therefore, provides a means for accurately controlling the movement of the food products through the construction so that the cooling operation can be controlled.

The construction can be employed for freezing the food products by utilizing fluids which are introduced at temperatures below freezing. By controlling the speed of the screw and the temperature of the fluid introduced, the degree of freezing can be accurately controlled. Similarly, the use of higher temperature fluids or more rapid movement of the products through the construction will provide for chilling without freezing.

Figure 3:
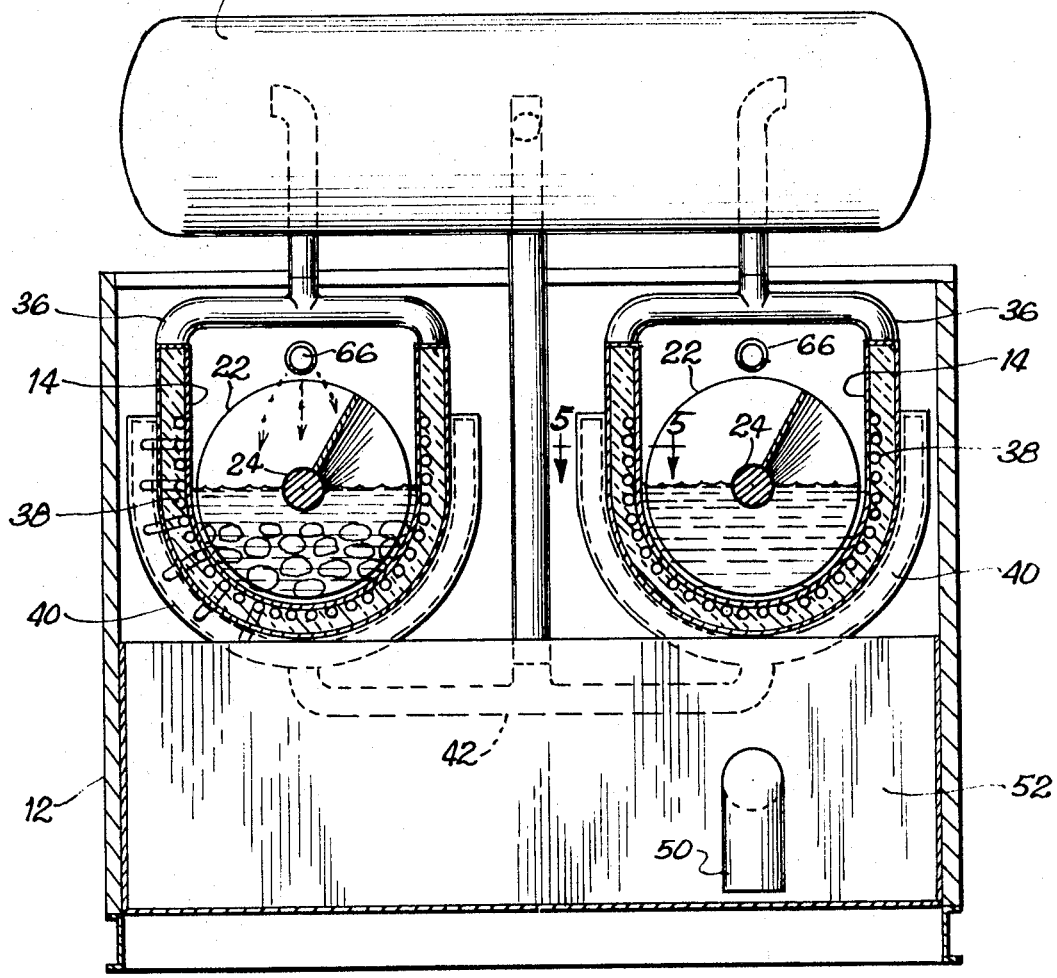
FIG. 3 is a vertical, sectional view taken about the line 3-3 of FIG. 2.

FIGS. 1 through 3 illustrate a construction 10 comprising a housing 12. As best shown in FIG. 3, a pair of troughs 14 are located in side-by-side relationship within the housing. Each of the troughs communicates with the basin 16 which is located at the entry end of the construction. A chute 18 is provided for introducing food products into this basin. Cooling fluid is introduced into the basin by means of a pipe 20.

Each of the troughs 14 carries a rotatable screw 22. The screws are formed on shafts 24 which are driven by motor 26 through sprocket and chain drives 28. The screws are rotated in a direction such that the products and fluid in the troughs will be urged toward the discharge end 30 of the construction.

A refrigeration means 31 is mounted beneath the troughs 14. This refrigeration means is adapted to deliver cooling fluid through line 32 into the tank 34. The fluid is then passed to manifolds 36 (FIG. 3) and into the elongated coils 38. Each of these coils includes a return line extending to manifolds 40 which return the fluid through line 42 to the tank 34. The fluid is then recirculated through line 44 to the cooling mechanism 31. For convenience in illustration, the coils 38 are shown extending from about the center of the construction toward the discharge end. These coils preferably also extend in the opposite direction so that the trough walls would be refrigerated along their entire length.

As noted, cooling fluid may be introduced into the basin 16 through the pipe 20. The pipe 20 extends to a pump 46 which is driven by motor 48. The intake 50 of the pump is located in the tank 52. Cooling fluid passing through the troughs 14 flows through separating screens 54 located at the ends of the troughs and falls into the tank 52. With this arrangement, the cooling fluid is continuously circulated through the system. A connection 56 is provided for the pipe 20 in order to add cooling fluid in amounts sufficient to maintain a relatively constant volume in the system.

Some of the cooling fluid entering into the basin 16 passes downwardly through line 58 in response to the action of the pump 60 driven by motor 62. The pump 60 delivers the cooling fluid through line 64 to spray headers 66.

The headers 66 extend directly above the screws 22, and these headers operate to distribute cooling fluid over the surface of the materials in the troughs. This arrangement is particularly desirable where food products tending to float in the cooling fluid are being chilled. Any exposed surfaces of the food products will be engaged by the sprays of cooling fluid to increase cooling efficiency. The operation of the spraying means could, of course, be eliminated in a particular case by providing suitable valve means.

As shown in FIG. 3, the outer periphery of the screw 22 is spaced from the interior surface of the troughs 14. This provides a passage for the cooling fluid; however, the space is such that the food products cannot bypass the blades. Accordingly, the cooling fluid can move through the system at a more rapid rate than the food products, and even though the fluid will tend to carry the food products at the same rate, the movement of the products will be retarded by the screw blades. This provides an ideal means for controlling the duration of contact of the cooling fluid and food product.

Figure 4:
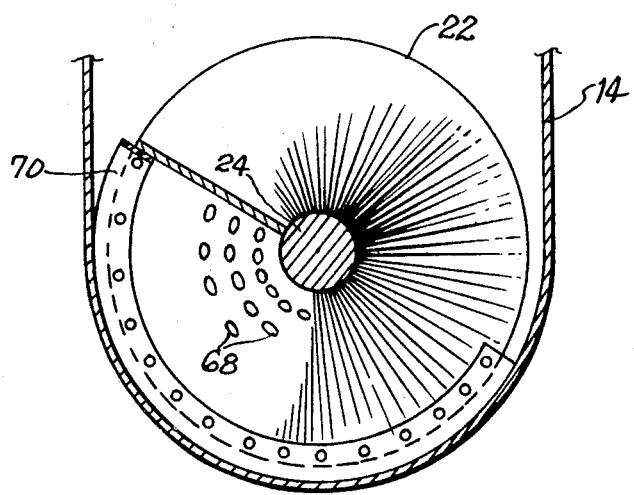
FIG. 4 is an enlarged fragmentary view illustrating a modified form of screw means employed in the construction.
Figure 5:
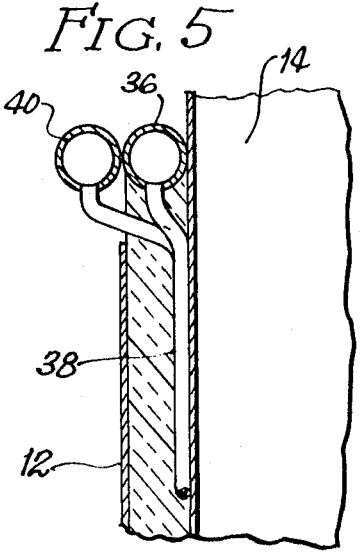
FIG. 5 is an enlarged fragmentary, sectional view taken about the line 5-5 of FIG. 3.

FIGS. 4 and 7 illustrate an alternative form of the invention wherein openings 68 are defined by the screw blade. In addition, the blade carries wiper blades 70 which engage the sidewalls of the trough 14. With this arrangement, the flow of the cooling fluid will tend to constantly shift from the periphery of the screw toward the center of the screw. Thus, during one portion of the cycle of rotation, the blade 70 will block passage around the periphery of the screw while the openings 68 will be available for fluid flow. On the other hand, when the screw has rotated through 180°, all of the fluid will flow around the periphery. This shifting of the fluid flow increases the effectiveness of the operation from the standpoint of rapid removal of heat from the food product.

In the operation of the construction, the cooling fluid may comprise water kept at a relatively low temperature whereby the food product will be chilled as it passes through the construction. An added benefit of the system is provided since cleaning of the food product will take place due to the washing action of the water. The food product will pass onto the screen 54 which serves as a chute for delivering the food product to suitable packing means. As indicated, the water will flow into the tank 52 for recirculation. If, however, washing is considered an important aspect of the operation, the water may be simply discharged from the tank, and clean water introduced into the basin 16.

A freezing operation can be readily accomplished with the system by employing a liquid maintained at temperatures below 32° F. The combination of this liquid and the use of a refrigerant passing through the coils 38 provides an extremely efficient means for freezing food products. Thus, the intimate contact achieved between the food product, the cooling liquid, and the surrounding trough walls provides for very rapid reduction in temperatures. This rapid freezing is known to provide better preservation of food values since slowly frozen products, for example meat, are found to suffer from surface dehydration and from the formation of large ice crystals with a resulting higher water content. The natural taste and food value of many types of food products can be advantageously enhanced with the rapid freezing system of the invention.

FIG. 8 illustrates an alternative form of the invention wherein the screw 22 rotates within an enclosure 72. The enclosure 72 is provided with refrigeration coils 74 which may carry, for example, liquid freon. The fluid 78 introduced along with the food product may also comprise liquid freon of a type acceptable for direct contact with food products.

The separate refrigeration system should carry a refrigerant having a lower boiling temperature than the refrigerant 78 so that this system will chill the refrigerant 78 and cause condensation of any vapors formed. Freon R-502 may be used in the coils at a temperature of −40° F. and Freon R-12, which has a boiling point of −21° F., may serve as the refrigerant 78.

The construction of the invention comprises a continuous flow process for the chilling or freezing of food products whereby the food products can be handled efficiently and with maximum preservation of food values. The use of a rotating screw in the manner described is particularly advantageous since the screw serves as a retarding means for the food product and, thus, does not act as a conveying means as is conventional. Due to the different flow rates of the cooling fluid and the food product, highly efficient heat transfer action takes place. The use of the rotatable screw as a retarding means also provides advantages because "pinching" of the food product between the screw and trough walls is avoided. The incidence of damage to the product is, therefore, substantially reduced.

It will be understood that various changes and modifications may be made in the above described system which provide the characteristics of this invention without departing from the spirit thereof particularly as defined in the following claims.

I claim:

1. A method for the cooling of food products comprising the steps of providing an elongated trough defining an inlet and outlet, introducing the products and a cooling liquid at the inlet end of said trough, moving said liquid along the length of the trough, the flow rate of said fluid being sufficient to move said products at a predetermined rate toward the outlet of the trough, providing a rotatable screw within said trough with openings being defined in the area of said screw, said openings being sufficiently large to permit passage of said liquid but insufficient to permit passage of said products, and driving said screw at a rate such that the screw operates to retard the movement of said product toward said outlet whereby said product moves through the trough at a rate below said predetermined rate.

2. A method in accordance with claim 1 including the steps of spraying cooling fluid onto the fluid and product within said trough.

3. A method in accordance with claim 1 including the step of providing refrigerating means around at least a portion of the trough walls.

4. A method in accordance with claim 3 wherein the cooling medium positioned around the trough walls is maintained at a temperature below 32° F.

5. A cooling construction for food products comprising an elongated trough defining an exterior wall, refrigeration means located along the exterior wall of said trough, means for introducing the products into one end of said trough, means for introducing cooling liquid into said trough, means for moving said liquid toward the opposite end of the trough whereby said liquid moves in the same direction as the products, a screw rotatable within said trough, openings defined in the area of said screw, said openings being sufficiently large to permit passage of said liquid but insufficient to permit passage of said products, at least part of said openings being formed by a space defined between the outer periphery of said screw and the wall of said trough, and wherein the means for moving said liquid operate at a rate sufficient to cause carrying of the products by the liquid at a rate in excess of the rate which would normally be imparted to the product by the screw, said screw thereby serving to retard the movement of the products whereby said liquid moves through the construction at a rate greater than said products.

6. A construction in accordance with claim 5 wherein at least part of said openings comprise openings defined by the blades of said screw.

7. A construction in accordance with claim 5 wherein said liquid has a boiling point below 32° F., and wherein the refrigeration means extend along said trough for maintaining the walls of the trough below said boiling point whereby vapor formed during operation of the construction will condense when contacting said walls.

8. A construction in accordance with claim 5 including a screen means located at the exit end of said trough whereby said liquid is adapted to be separated from said products as the liquid and products are discharged from the trough.

9. A construction in accordance with claim 3 including means for recirculating liquid discharged from said trough.

10. A construction in accordance with claim 5 wherein at least some of said products have portions exposed above the level of the liquid in said trough, and including spray means for directing liquid onto said exposed portions.

11. A cooling construction for food products comprising an elongated trough, means for introducing the products into one end of said trough, means for introducing cooling fluid into said trough, means for moving said fluid toward the opposite end of the trough, a screw rotatable within said trough, openings defined in the area of said screw, said openings being sufficiently large to permit passage of said fluid but insufficient to permit passage of said products, at least part of said openings being formed by a space defined between the outer periphery of said screw and the wall of said trough, and including a plurality of wiper blades attached at spaced intervals along the periphery of said screw, said wiper blades operating to periodically close off said space as said screw rotates, and openings defined by the screw at positions adjacent said wiper blades whereby said fluid will pass through said openings when said wiper blades close off said space, and wherein the means for moving said fluid operate at a rate sufficient to carry the products at substantially the same rate as the fluid with said screw serving to retard the movement of the products whereby said fluid moves through the construction at a rate greater than said products.